US012211529B1

(12) United States Patent
Szita et al.

(10) Patent No.: US 12,211,529 B1
(45) Date of Patent: Jan. 28, 2025

(54) FAST CHARACTERIZATION OF MEDIA-NOISE-INDUCED REPEATABLE RUNOUT

(71) Applicants: Kabushiki Kaisha Toshiba, Tokyo (JP); Toshiba Electronic Devices & Storage Corporation, Tokyo (JP)

(72) Inventors: Gabor Szita, Mountain View, CA (US); Richard M. Ehrlich, Edina, MN (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/451,729

(22) Filed: Aug. 17, 2023

(51) Int. Cl.
*G11B 5/596* (2006.01)

(52) U.S. Cl.
CPC ...... *G11B 5/59627* (2013.01); *G11B 5/59638* (2013.01); *G11B 5/59655* (2013.01)

(58) Field of Classification Search
CPC ......... G11B 5/00; G11B 5/09; G11B 5/59666; G11B 5/248; G11B 5/59661; G11B 27/36; G11B 5/54; G11B 5/5539; G11B 5/56; G11B 5/58; G11B 5/59688
USPC ......................................... 360/75, 77.04, 76
See application file for complete search history.

(56) References Cited

U.S. PATENT DOCUMENTS

| 6,977,792 | B1 | 12/2005 | Melrose et al. |
| 7,136,889 | B1 * | 11/2006 | Schreck ................. G06F 7/588 |
| | | | 708/250 |
| 10,109,301 | B1 | 10/2018 | French, Jr. et al. |
| 10,741,206 | B2 | 8/2020 | Tagami |
| 2002/0067567 | A1 * | 6/2002 | Szita .................... G11B 19/045 |
| | | | 360/77.04 |

* cited by examiner

*Primary Examiner* — Nabil Z Hindi
(74) *Attorney, Agent, or Firm* — Kim & Stewart LLP

(57) ABSTRACT

A computer-implemented method for preparing a disk for a disk drive for operation includes: writing first and second servo information in a first portion of a servo sector for a track of the disk; writing third and fourth servo information in a second portion of the servo sector; in a single revolution of the disk, reading a first signal associated with the first servo information, a second signal associated with the second servo information, a third signal associated with the third servo information, and a fourth signal associated with the fourth servo information; based on the first signal, the second signal, the third signal, and the fourth signal, determining a repeatable runout value for the servo sector; and storing the repeatable runout value for the servo sector in a location that is accessed during operation and used during the operation as a repeatable runout correction factor for the track.

20 Claims, 5 Drawing Sheets

FAST CHARACTERIZATION OF MEDIA-NOISE-INDUCED REPEATABLE RUNOUT

BACKGROUND

For proper operation of a hard disk drive (HDD), a magnetic head of the HDD must be positioned at a desired radial location with high accuracy. For example, when reading data from or writing data to a particular data track of the HDD, the magnetic head is precisely positioned at a specific data track center to avoid read errors or overwriting data in adjacent data tracks.

Deviation of the actual radial position of a magnetic head from an ideal or intended radial position causes the magnetic head and associated electronics to generate a position error signal (PES), and can be divided into two components: non-repeatable runout (NRRO) and repeatable runout (RRO). NRRO at a particular location on a disk is different with each revolution of the disk and is typically computed by subtracting the repeatable runout (RRO) from a raw PES measurement. By contrast, RRO repeats for each disk revolution, and is typically caused by disk distortion, inaccurately positioned servo patterns on the media (such as servo spirals or servo wedges), and media noise. RRO is typically computed using sector-by-sector synchronous averaging of the raw PES, where the raw PES is measured over multiple disk revolutions for a particular radial location on the surface of a disk, such as a data track.

RRO can be further divided into two components: coherent RRO and non-coherent RRO. Coherent RRO is the portion of RRO that is identical in a region of adjacent tracks, and is typically caused by disk distortion and coherent inaccuracies in the positioning of the write head when servo patterns are written on the disk. Non-coherent RRO is the portion of RRO that is different in adjacent tracks. Therefore, non-coherent RRO in one track cannot be predicted based on the non-coherent RRO of an adjacent track. Non-coherent RRO is typically caused by inaccurately positioned servo sectors and media noise due to the effect of media magnetic granularity. Typically, media noise contributes to RRO as random white noise. Excessive non-coherent RRO in an HDD can be problematic in multiple situations, including during read operations and factory verification of servo sectors.

During read/write operations, data are read from a particular data track of an HDD, and a magnetic head is precisely positioned as accurately as possible at the data track center to avoid read/write errors. When read/write errors do occur, data must be re-read from the data track or re-written on the data track over one or more additional revolutions of the disk, which can significantly reduce the read/write performance of the HDD. Because the magnitude of non-coherent RRO can be significant relative to the width of typical data tracks, non-coherent RRO that occurs in an HDD is likely to cause read/write errors, and therefore adversely affect the performance of the HDD.

During factory verification of servo sectors, the positions of servo sectors that are written on a disk surface are checked for inaccuracies. In a typical hard disk drive, servo sectors are used to provide position information for a read or write head over a disk surface, and can be written on a disk via servo track-writing equipment or by a self-servo writing process. The position information recovered from the servo sectors typically includes some inaccuracy due to noise components caused by media (disk) granularity. Characterizing and correcting for this inaccuracy during the factory verification process typically involves measuring RRO on each track, then computing and storing appropriate position correction factors for each servo sector of that track. Measuring RRO on a specific track requires collecting PES information for several revolutions, so that averaging of PES over these revolutions can separate the PES into RRO and NRRO components. Because an HDD can include hundreds of thousands of tracks on each disk surface, measuring RRO in this way requires a significant amount of factory time. As a result, factory verification of servo sectors is a time-consuming step in the HDD manufacturing process.

In light of the above, there is a need in the art for reducing the non-coherent RRO that occurs in HDDs and more efficiently characterizing such RRO during HDD manufacturing.

SUMMARY

One or more embodiments provide systems and methods for reducing the time needed to characterize servo position inaccuracies of disk drive servo sectors caused by media granularity noise. Specifically, embodiments enable characterization of the media noise component of RRO for each servo sector of a data track in a single revolution of a disk. According to the embodiments, enhanced servo sectors are written on each disk surface that include additional servo bursts. The additional servo bursts are disposed in a user data area and are subsequently overwritten by user data during normal disk drive operation. In the embodiments, the additional servo bursts have a greater burst length than the conventional servo bursts of the servo sector that are not written in the user data area. As a result, the effect of media granularity noise in the additional servo bursts is significantly reduced, and the additional servo bursts can provide a position-error signal (PES) that that has little or no media noise component even though the additional servo bursts are read a single time. Thus, for a particular servo sector of a track, the media noise component of the PES that is generated using the conventional servo bursts of the servo sector can be determined by subtracting the PES provided by the additional servo bursts from the PES provided by the conventional servo bursts. This media noise component is then included in the position correction factor for that particular servo sector.

According to an embodiment, a computer-implemented method of preparing a disk for a disk drive for operation includes: writing first servo information and second servo information in a first portion of a servo sector for a track of the disk; writing third servo information and fourth servo information in a second portion of the servo sector; in a single revolution of the disk, reading a first signal associated with the first servo information, a second signal associated with the second servo information, a third signal associated with the third servo information, and a fourth signal associated with the fourth servo information; based on the first signal, the second signal, the third signal, and the fourth signal, determining a repeatable runout value for the servo sector; and storing the repeatable runout value for the servo sector in a location that is accessed during operation and used during the operation as a repeatable runout correction factor for the track.

A disk drive, according to an embodiment, includes: a magnetic head, a disk with a surface on which magnetic servo information can be written, and a controller. The controller is configured to perform the steps of: writing first servo information and second servo information in a first portion of a servo sector for a track of the disk; writing third servo information and fourth servo information in a second portion of the servo sector; in a single revolution of the disk, reading a first signal associated with the first servo information, a second signal associated with the second servo information, a third signal associated with the third servo information, and a fourth signal associated with the fourth servo information; based on the first signal, the second signal, the third signal, and the fourth signal, determining a repeatable runout value for the servo sector; and storing the repeatable runout value for the servo sector in a location that is accessed during operation and used during the operation as a repeatable runout correction factor for the track.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
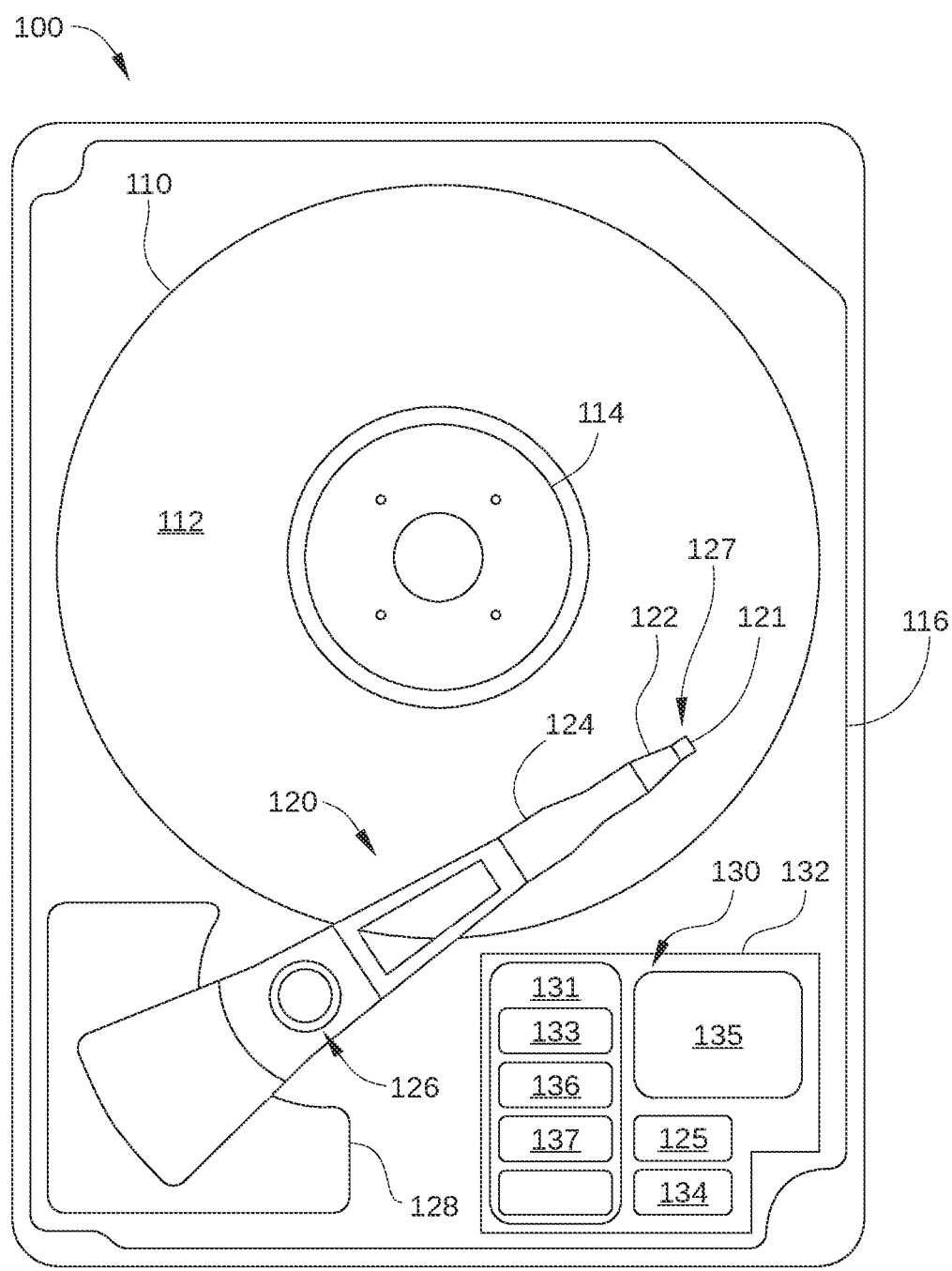
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track.

Each read/write head 127 is a magnetic head that includes a read head and a write head (not shown). The read head is configured to generate an output signal when moving past data or servo information written to the surface of the storage disk 110 that is associated with read/write head 127. The write head is configured to write information to the surface of the storage disk 110 that is associated with read/write head 127.

Spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown) can be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers), a flash memory device 135, and, in some embodiments, a flash manager device 136. In some embodiments, read/write channel 137, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read sensor of read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges on the recording surface 112 as a reference. One embodiment of a recording surface 112 is illustrated in FIG. 2.

Figure 2:
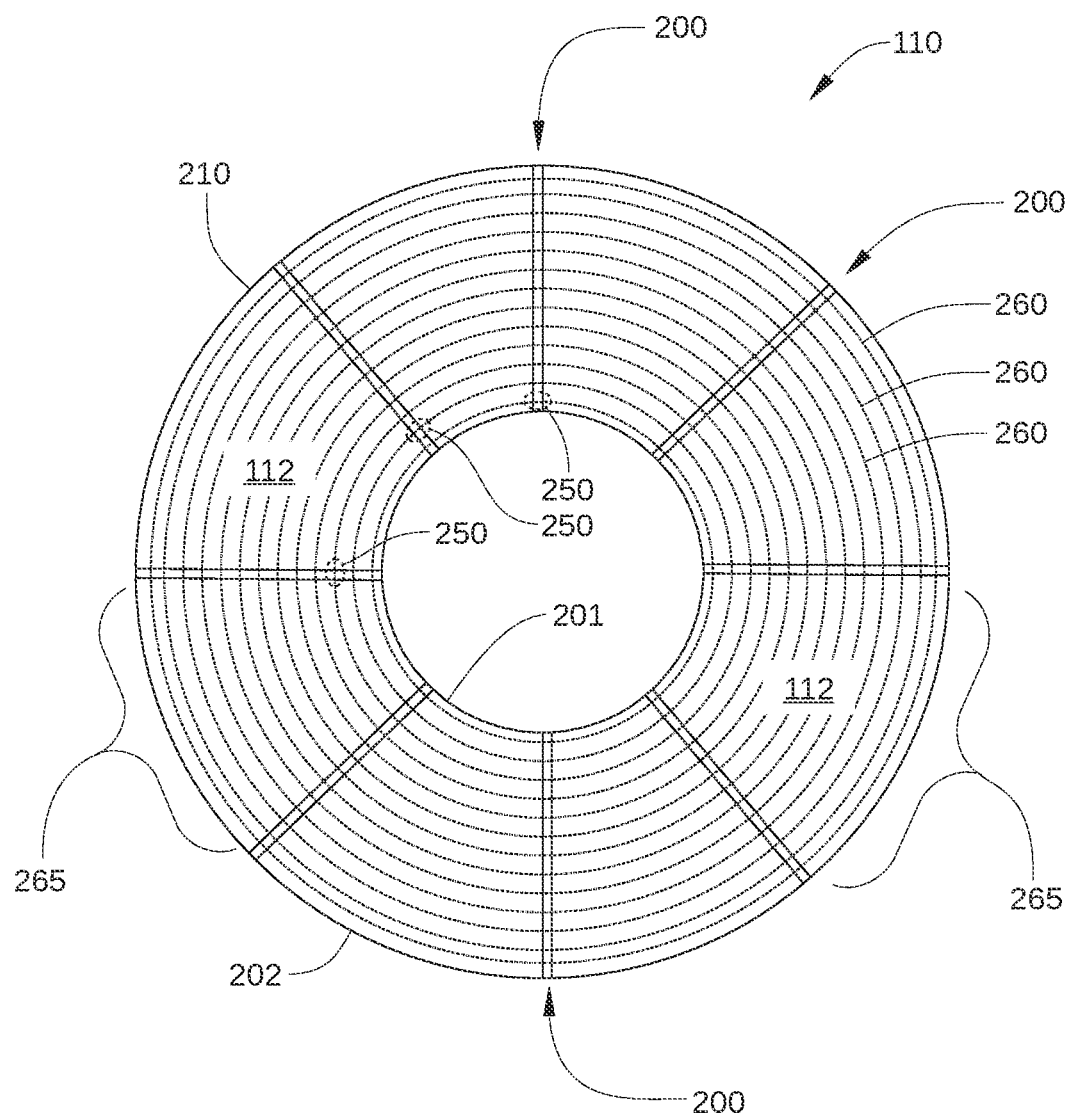
FIG. 2 illustrates a recording surface of a storage disk with servo wedges and concentric data storage tracks formed thereon, according to an embodiment.

FIG. 2 illustrates a recording surface 112 of a storage disk 110 with servo wedges 200 and concentric data storage tracks 260 formed thereon, according to an embodiment. Servo wedges 200 may be written on recording surface 112 by either a media writer or by HDD 100 itself via a self-servo-write (SSW) process. Servo wedges 200 may be substantially radially aligned. In practice, servo wedges 200 may be somewhat curved. For example, servo wedges 200 may be configured in a spiral pattern that mirrors the path that would be followed by read/write head 127 if read/write head 127 were to be moved across the stroke of actuator arm assembly 120 while storage disk 110 is not spinning. Such a curved pattern advantageously results in the wedge-to-wedge timing being independent of the radial position of read/write head 127. For simplicity, servo wedges 200 are depicted as substantially straight lines in FIG. 2. Each servo wedge 200 includes a plurality of servo sectors 250 containing servo information that defines the radial position and track pitch, i.e., spacing, of data storage tracks 260.

Data storage tracks 260 for storing data are located in data sectors 265 as shown, and the radial position of each data storage track 260 is defined by the servo information written in servo sectors 250 for that data storage track 260. More specifically, each servo sector 250 for a particular data storage track 260 contains servo information that is read by read/write head 127 during read and write operations to position read/write head 127 above that particular data storage track 260. Typically, the actual number of data storage tracks 260 and servo wedges 200 included on recording surface 112 is considerably larger than illustrated in FIG. 2. For example, recording surface 112 may include hundreds of thousands of concentric data storage tracks 260 and hundreds of servo wedges 200.

Enhanced Servo Sector

According to various embodiments, each servo sector 250 of storage disk 110 includes enhanced servo information that enables characterization of repeatable runout (RRO) associated with a particular data storage track 260 in a single revolution of storage disk 110. Specifically, the enhanced servo information includes additional servo bursts that are much less subject to the effect of media noise on position decoding than the conventional servo bursts that are included in servo sector 250. One embodiment of a servo sector 250 and its enhanced servo information is described below in conjunction with FIG. 3.

Figure 3:
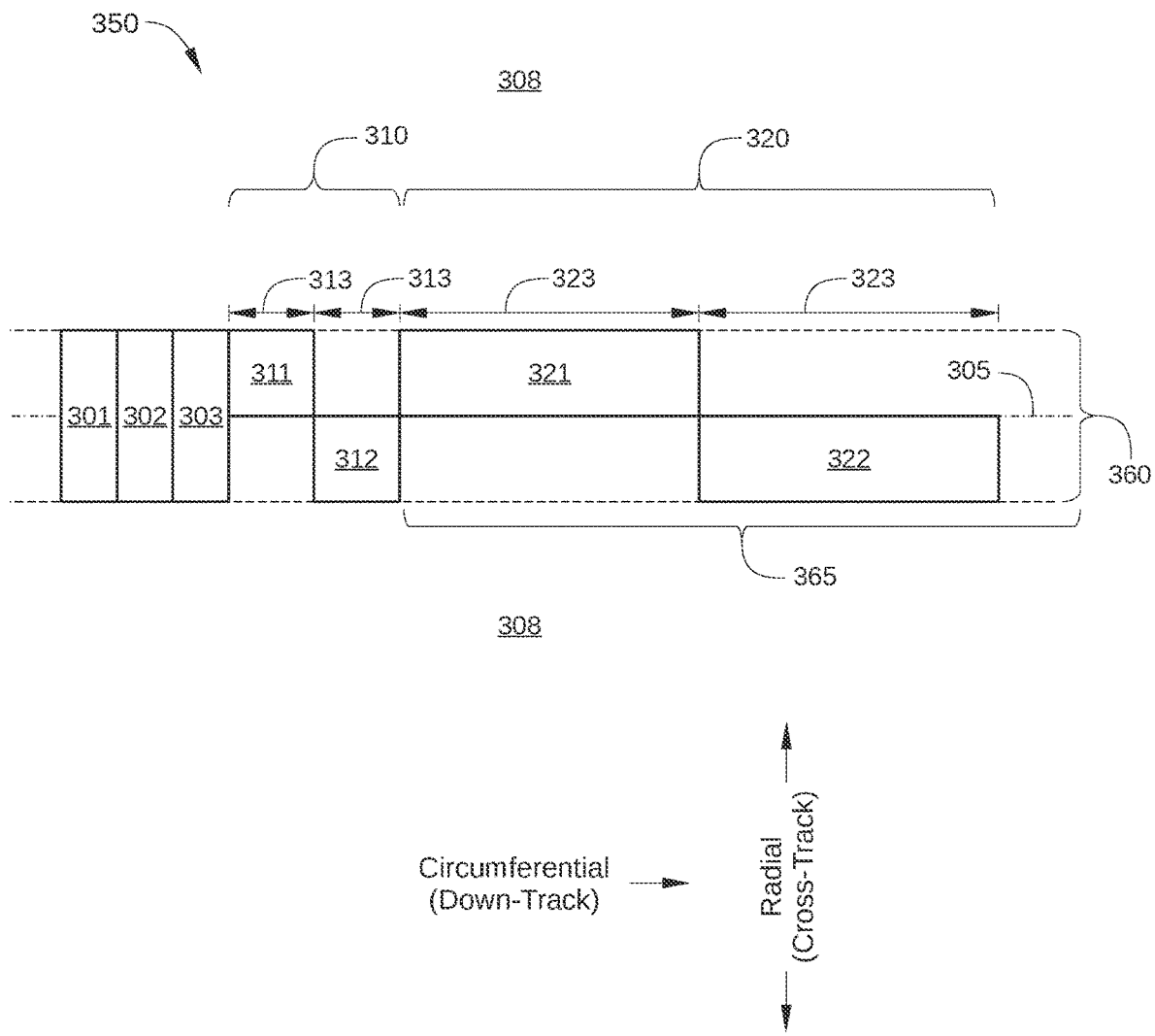
FIG. 3 is a more detailed schematic illustration of a data storage track and an associated enhanced servo sector formed thereon, according to an embodiment.

FIG. 3 is a more detailed schematic illustration of a data storage track 360 and an associated enhanced servo sector 350 formed thereon, according to an embodiment. Data storage track 360 can be disposed on a recording surface 308 of an HDD storage disk, such as a storage disk 110 shown in FIGS. 1 and 2. In the embodiment shown in FIG. 3, enhanced servo sector 350 is disposed on data storage track 360 and includes a preamble 301, track-identifying information 302 (such as Gray code), permanent servo information 310, and additional servo information 320. In some embodiments, enhanced servo sector 350 further includes a correction factor field 303 for storing position correction factors for enhanced servo sector 350. Determination of such position correction factors is described in greater below. In the embodiment shown in FIG. 3, correction factor field 303 is disposed on data storage track 360 between track-identifying information 302 and permanent servo information 310, while in other embodiments, correction factor field 303 is disposed at any other technically feasible location within enhanced servo sector 350.

In operation, a read/write head (not shown) passes over enhanced servo sector 350 in a circumferential (or "down-track") direction, and the servo information included in enhanced servo sector 350 enables a servo system of an HDD to determine the position of the read/write head relative to data storage track 360 in a radial (or cross-track) direction. For reference, a circumferential (or down-track) direction and a radial (or cross-track) direction are indicated in FIG. 3.

Preamble 301 includes a signal written with constant frequency and amplitude that is used for automatic gain control, read/write clock synchronization, etc. Thus, preamble 301 prepares a servo system of the HDD to receive information from servo wedge 300.

Track-identifying information 302 includes information that encodes information identifying data storage track 360, such as a servo track number. Typically, track-identifying information 302 encodes the servo track number with redundancy, for example via Gray code, which is a noise-immune encoding scheme well-known in the art. In operation, a servo system employs such encoding for fast and consistent reading of a servo-track number. Generally each enhanced servo sector 350 of data storage track 360 has the same servo-track number encoded. In some embodiments, track-identifying information 302 further includes an address mark that indicates the beginning of the Gray code portion of track-identifying information 302. In some embodiments, track-identifying information 302 of one enhanced servo sector 350 on data storage track 360 further includes an index signal (not shown) that facilitates tracking rotations of the storage disk.

Permanent servo information 310 includes position information written with constant frequency and amplitude that is employed to generate a PES associated with enhanced servo sector 350 during normal operation of the HDD. In the embodiment illustrated in FIG. 3, permanent servo information 310 includes a first servo burst 311 and a second servo burst 312, which are positioned relative to a centerline 305 of data storage track 360 such that reference signals are generated when a read head (not shown for clarity) passes over enhanced servo sector 350. By comparing the amplitude of such reference signals, the servo system can determine the sub-track position of the read head relative to data storage track 360. For example, in the embodiment illustrated in FIG. 3, a first reference signal is associated with first servo burst 311 and a second reference signal is associated with second servo burst 312. In the embodiment, first servo burst 311 is written on one side of centerline 305 of data storage track 360 and second servo burst 312 is written on an opposite side of centerline 305 of data storage track 360. Therefore, in such an embodiment, equal amplitude of the first reference signal and the second reference signal indicates that the sub-track position of the read head is positioned over centerline 305, increasing amplitude of the first reference signal and decreasing amplitude of the second reference signal indicates that the sub-track position of the read head is to the left (towards top of page) of centerline 305, and decreasing amplitude of the first reference signal and increasing amplitude of the second reference signal indicates that the sub-track position of the read head is to the right (towards bottom of page) of centerline 305.

In other embodiments, any other suitable format for permanent servo information 310 can be employed in enhanced servo sector 350 to generate a PES value associated with enhanced servo sector 350. For example, in some embodiments, a null servo burst pattern can be used, wherein first servo burst 311 and second servo burst 312 is written in the same circumferential location, but with opposite phase. Therefore, in such embodiments, zero amplitude of the reference signal indicates that the sub-track position of the read head is positioned over centerline 305, increasing amplitude of the reference signal with first phase indicates that the sub-track position of the read head is to the left (towards top of page) of centerline 305, and increasing amplitude with second phase of the reference signal indicates that the sub-track position of the read head is to the right (towards bottom of page) of centerline 305. In other embodiments, a quadrature servo burst pattern can be used, in which several more servo burst pairs can be included in permanent servo information 310 that are written with some radial offset from the centerline. These additional burst pairs can be used to improve positioning accuracy when the head is positioned away from centerline 305. Further, in some embodiments, permanent servo information 310 can include any other technically feasible configuration of servo bursts for radial positioning of a read/write head.

As described previously, the granularity of the magnetic layer of recording surface 308 can affect the amplitude of servo burst signals, such as the reference signals associated with first servo burst 311 and second servo burst 312. For example, this media granularity can cause a reference signal generated by a read head to erroneously change in magnitude when reading a series of magnetic transitions having equal magnitude and radial position on recording surface 308. Such changes to the amplitude of burst signals generally appear as an undesirable and unpredictable white noise component in the RRO for enhanced servo sector 350. This media granularity component of the RRO for a particular enhanced servo sector 350 causes a repeatable inaccuracy in the measured sub-track position of the read head relative to data storage track 360 each time the read head passes over that particular enhanced servo sector 350. As the areal density of bits stored on HDD disks continues to increase, the magnitude of this inaccuracy (or RRO) can be significant relative to the width of a data storage track. A known method for reducing this inaccuracy in a particular data track is to take a synchronous average of PES over multiple revolutions of the disk (e.g., four or five revolutions) while servoing over that particular data track, and then computing an appropriate correction factor for each servo sector of that particular data track. According to various embodiments described below, appropriate correction factors for each enhanced servo sector 350 of a particular data track 360 can be determined in a single revolution, based on position information provided by additional servo information 320.

Additional servo information 320 includes position information written with constant frequency and amplitude that is employed to generate a PES associated with enhanced servo sector 350 during calibration of the HDD. In the embodiment illustrated in FIG. 3, additional servo information 320 includes an additional servo burst 321 and an additional servo burst 322, which are similar to first servo burst 311 and second servo burst 312. Specifically, additional servo burst 321 and additional servo burst 322 can be employed by the servo system to generate a PES value associated with enhanced servo sector 350. In contrast to first servo burst 311 and second servo burst 312, additional servo burst 321 and additional servo burst 322 can be employed by the servo system to determine a low-RRO PES that is not significantly affected by media noise present in recording surface 308. Further, additional servo bursts 321 and 322 are disposed in a portion of data storage track 360 that is designated as a data sector 365 of data storage track 360. As noted above with respect to data sectors 265 of data storage tracks 260 in FIG. 2, a data sector 365 of data storage track 360 corresponds to a portion of data storage track 360 that is for storing data during normal operation, such as user data or host-provided data. Thus, additional servo burst 321 and additional servo burst 322 are disposed in a portion of data storage track 360 that can be overwritten with data during normal operation of the HDD, and are not used to generate a PES during normal operation of the HDD.

As noted above, additional servo burst 321 and additional servo burst 322 are employed by the servo system to determine a low-RRO PES that is not significantly affected by media noise present in recording surface 308. According to various embodiments, this low-RRO PES can be used in conjunction with the PES generated based on permanent servo information 310 to determine an accurate correction factor that compensates for the RRO of enhanced servo sector 350. As shown, additional servo burst 321 and additional servo burst 322 each have a circumferential (downtrack) length 323 that is significantly greater than a circumferential length 313 of first servo burst 311 and second servo burst 312. In general, the effect of random media noise on position decoding is reduced as the square root of servo burst length. For example, increasing the burst length by a factor of 4 reduces the effect of media granularity on positioning accuracy by a factor of 2. As a result, when circumferential length 323 is of sufficient magnitude, the media granularity RRO component of the low-RRO PES (which is determined based on additional servo burst 321 and additional servo burst 322) approaches zero. Based on the assumption that the media granularity RRO component of the low-RRO PES approaches zero, an accurate correction factor can be determined (as described below) that compensates for the media granularity component of the RRO associated with enhanced servo sector 350.

In some embodiments, the media granularity component of the RRO associated with a particular enhanced servo sector 350 is defined as $RRO_{Media-310}$, and represents the contribution of media granularity noise to the $PES_{310}$ that is generated when the read/write head passed over permanent servo information 310. In such embodiments, $RRO_{Media-320}$ represents the contribution of media granularity noise to the $PES_{320}$ that is generated when the read/write head passed over additional servo information 320. It is noted that, when the read/write head is tracking on a particular data storage track 360, $PES_{310}$ and $PES_{320}$ both have substantially the same non-repeatable runout (NRRO) component, which is typically caused by small, random perturbations in the sub-track position of the read/write head during a particular disk revolution. Consequently, $PES_{310}$ and $PES_{320}$ can be defined by Equations 1 and 2, where $NRRO_k$ is the NRRO component of PES at servo sector k:

$$PES_{310} = NRRO_k + RRO_{Media-310} \quad (1)$$

$$PES_{320} = NRRO_k + RRO_{Media-320} \quad (2)$$

Combining Equations 1 and 2 and assuming that $RRO_{Media-320}$ approaches zero, $RRO_{Media-310}$ for a particular servo sector k can be determined based on Equation 3:

$$RRO_{Media-310} = PES_{310} - PES_{320} \quad (3)$$

Enhanced Servo Sector Alternative Embodiments

In the embodiments described above, a single servo burst (additional servo burst 321) is written on one side of centerline 305 and a single servo burst (additional servo burst 322) is written on the opposite side of centerline 305. In other embodiments, additional servo information 320 includes multiple servo bursts written on each side of a centerline of a data storage track. One such embodiment is described below in conjunction with FIG. 4.

Figure 4:
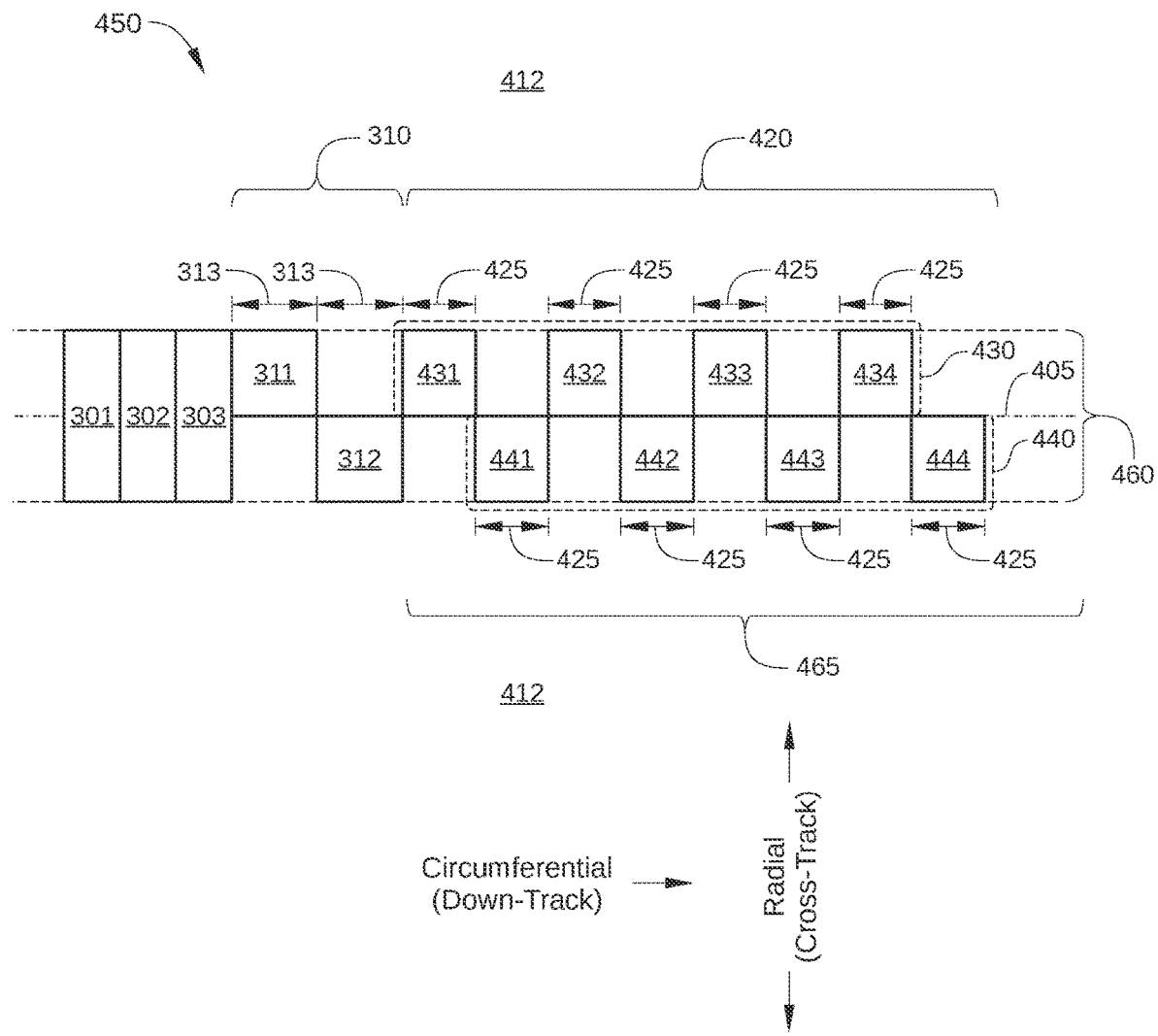
FIG. 4 is a more detailed schematic illustration of three adjacent data storage tracks, each with an associated servo sector formed thereon, according to an embodiment.

FIG. 4 is a more detailed schematic illustration of a data storage track 460 and an associated enhanced servo sector 450 formed thereon, according to an embodiment. Data storage track 460 can be disposed on a recording surface 412 of an HDD storage disk, such as a storage disk 110 shown in FIGS. 1 and 2. Enhanced servo sector 450 is similar to enhanced servo sector 350 shown in FIG. 3, except that additional servo information 420 of enhanced servo sector 450 includes multiple sets of additional servo bursts. For example, in the embodiment illustrated in FIG. 4, additional servo information 420 includes a first set 430 of additional servo bursts 431, 432, 433, and 434 and a second set 440 of additional servo bursts 441, 442, 443, and 444, where the additional servo bursts of first set 430 are disposed on one side of a centerline 405 of data storage track 460 and the additional servo bursts of second set 440 are disposed on an opposite side of centerline 405 of data storage track 460. As shown, each additional servo burst has a circumferential length 425, and is disposed in data sector 365 of data storage track 460. Further, circumferential length 425 can be different than circumferential length 313 of first servo burst 311 and second servo burst 312.

In some embodiments, circumferential length 425 can be greater than circumferential length 313, in some embodiments, circumferential length 425 can be less than circumferential length 313, and in some embodiments, circumferential length 425 can be equal to circumferential length 313. However, the sum of the circumferential lengths 425 of the additional servo bursts included in first set 430 is significantly greater than circumferential length 313. Similarly, the sum of the circumferential lengths 425 of the additional servo bursts included in second set 440 is significantly greater than circumferential length 313. Consequently, a $PES_{420}$ based on a read/write head passing over additional servo information 420 has a very small or insignificant RRO component caused by media granularity. As a result, for a $PES_{410}$ based on a read/write head passing over permanent servo information 310, a media granularity RRO component can be determined based on a difference between $PES_{410}$ and $PES_{420}$, for example via Equation 3 set forth above.

Implementation of Enhanced Servo Sectors

Figure 5:
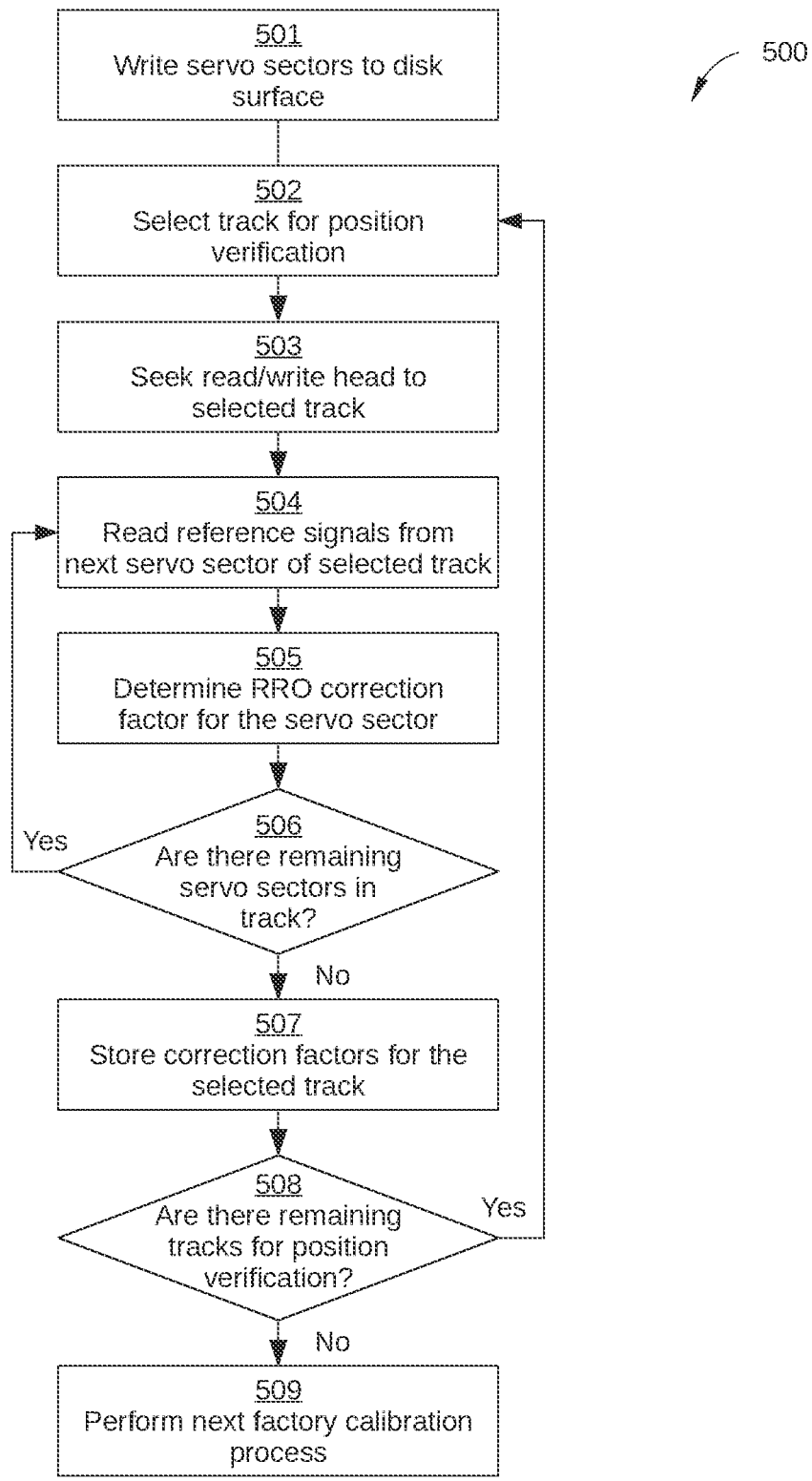
FIG. 5 sets forth a flowchart of method steps for preparing an HDD for operation, according to various embodiments.

FIG. 5 sets forth a flowchart of method steps for preparing an HDD for operation, according to various embodiments. The method steps may include one or more operations, functions, or actions as illustrated by one or more of blocks 501-509. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-4, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits. Alternatively or additionally, in some embodiments, the control algorithms for one or more of the method steps may reside in a suitable controller external to HDD 100, such as a factory controller that causes HDD 100 to perform the one or more method steps or a factory device (such as a factory servo-writing device) employed in implementing factory processes associated with HDD 100, such as calibration and the like.

A method 500 begins at step 501, when a suitable controller (e.g., microprocessor-based controller 133) causes servo sectors to be written for each data storage track of an HDD. In some embodiments, the servo sectors are written by HDD 100 via a conventional SSW process. In such embodiments, servo information that is disposed on one side of a centerline of a data storage track (e.g., first servo burst 311 and additional servo burst 321) can be written in one revolution of the storage disk, while servo information that is disposed on the opposite side of the centerline (e.g., second servo burst 312 and additional servo burst 322) can be written in another revolution of the storage disk. Alternatively, in some embodiments, the servo sectors are written on one or more recording surfaces 112 of HDD 100 with an external media writer before assembly of the disk drive.

In step 502, the controller selects a data storage track 260 on a particular recording surface 112 on which to perform position verification. In the position verification process, inaccuracies in the positions of servo sectors are characterized, and a correction factor for each servo sector is determined that can compensate for the RRO associated with such inaccuracies. In some embodiments, these inaccuracies are primarily due to random noise caused by media granularity. In some embodiments, these inaccuracies can also be due in part to other factors, such as the physical displacement of a servo sector from an ideal or expected location due to mechanical contributions like disk vibration during servo sector writing.

In step 503, the controller seeks a read/write head 127 to the data storage track 260 selected in step 502, where the read/write head corresponds to the particular recording surface 112. Generally, the servo system of HDD 100 performs the seek by determining the radial position of read/write head 127 based on track-identifying information 302 and permanent servo information 310 for data storage tracks 260 formed on the recording surface 112.

In step 504, when the read/write head 127 is positioned on the data storage track 260 selected in step 502, the controller reads or receives reference signals from the next servo sector 250 that the read/write head 127 passes over, referred to herein as servo sector 250$k$. Specifically, the controller reads or receives reference signals from permanent servo information 310 (for example when the read/write head passes over first servo burst 311 and second servo burst 312) and reference signals from additional servo information 320 (for example when the read/write head passes over additional servo burst 321 and additional servo burst 322).

In step 505, the controller determines an RRO correction factor for the servo sector passed over in step 504, i.e., servo sector 250$_k$. For example, in some embodiments, the controller demodulates a position for the read/write head 127 based on a first signal associated with the read/write head passing over first servo burst 311 and on a second signal associated with the read/write head passing over second servo burst 312. Based on the demodulated position, the controller then determines $PES_{310}$ for the read/write head 127 at servo sector $250_k$. Similarly, the controller demodulates a position for the read/write head 127 based on a third signal associated with the read/write head passing over additional servo burst 321 and on a fourth signal associated with the read/write head passing over additional servo burst 322. Based on the demodulated position, the controller then determines $PES_{320}$ for the read/write head 127 at servo sector $250_k$. The controller then determines an RRO correction factor for servo sector $250_k$ based on Equation 3 set forth above.

In step 506, the controller determines whether there are any remaining servo sectors 250 for the selected data storage track 260. If yes, method 500 returns to step 504, and the controller reads reference signals from the next servo sector 250 that the read/write head 127 passes over; if no, method 500 proceeds to step 507.

In step 507, the controller stores the correction factors for the servo sectors 250 of the selected data storage track 260. In some embodiments, the correction factor for a particular servo sector 250 is written to a location within or adjacent to that particular servo sector, such as correction factor field 303. Thus, in normal operation, the correction factor can be read when other servo information is read from the servo sector. Alternatively or additionally, in some embodiments, the correction factor for a particular servo sector 250 is written to any suitable non-volatile memory location, such as flash memory device 135.

In step 508, the controller determines whether there are any remaining data storage tracks 260 in HDD 100 that have yet to undergo the position verification process. If yes, method 500 returns to step 502, and the controller selects the next data storage track 260 to undergo the position verification process; if no, method 500 proceeds to step 509.

In step 509, HDD 100 undergoes the next applicable factory process. For example, in some embodiments, HDD 100 undergoes a media scan, in which faulty data sectors of HDD 100 are detected by writing data to and reading data from each data sector 265 of HDD 100. In another example, one or more servo system calibration processes are performed by HDD 100.

Implementation of method 500 enables the characterization of the effect of media noise on the position decoding of the servo sectors of a data storage track in a single revolution of a storage disk 110. As a result, HDD 100 can complete factory calibration in a greatly reduce time compared to an HDD using conventional techniques. For example, the position verification process can be shortened by multiple days.

While the foregoing is directed to embodiments of the present invention, other and further embodiments of the invention may be devised without departing from the basic scope thereof, and the scope thereof is determined by the claims that follow.

We claim:

1. A computer-implemented method of preparing a disk for a disk drive for operation, the method comprising:
   writing first servo information and second servo information in a first portion of a servo sector for a track of the disk;
   writing third servo information and fourth servo information in a second portion of the servo sector;
   in a single revolution of the disk, reading a first signal associated with the first servo information, a second signal associated with the second servo information, a third signal associated with the third servo information, and a fourth signal associated with the fourth servo information;
   based on the first signal, the second signal, the third signal, and the fourth signal, determining a repeatable runout value for the servo sector; and
   storing the repeatable runout value for the servo sector in a location that is accessed during operation and used during the operation as a repeatable runout correction factor for the track,
   wherein the first servo information comprises a servo burst with a first duration and the third servo information comprises at least one servo burst with a longer duration than the first duration.

2. The computer-implemented method of claim 1, wherein the second portion of the servo sector corresponds to one or more data sectors of the track.

3. The computer-implemented method of claim 1, wherein the first portion of the servo sector is positioned to be crossed by a read head during the single revolution before the second portion of the servo sector is crossed by the read head during the single revolution.

4. The computer-implemented method of claim 1, wherein the first servo information and the third servo information are written during a first revolution of the disk and the second servo information and the fourth servo information are written during a second revolution of the disk.

5. The computer-implemented method of claim 1, wherein the second servo information comprises a servo burst with a second duration and the fourth servo information comprises at least one servo burst with a longer duration than the second duration.

6. A computer-implemented method of preparing a disk for a disk drive for operation, the method comprising:
   writing first servo information and second servo information in a first portion of a servo sector for a track of the disk;
   writing third servo information and fourth servo information in a second portion of the servo sector;
   in a single revolution of the disk, reading a first signal associated with the first servo information, a second signal associated with the second servo information, a third signal associated with the third servo information, and a fourth signal associated with the fourth servo information;
   based on the first signal, the second signal, the third signal, and the fourth signal, determining a repeatable runout value for the servo sector; and
   storing the repeatable runout value for the servo sector in a location that is accessed during operation and used during the operation as a repeatable runout correction factor for the track,
   wherein the first servo information comprises a servo burst with a first duration and the third servo information comprises multiple servo bursts that collectively have a longer duration than the first duration.

7. The computer-implemented method of claim 6, wherein the second servo information comprises a servo burst with a second duration and the fourth servo information comprises multiple servo bursts that collectively have a longer duration than the second duration.

8. The computer-implemented method of claim 1, wherein determining the repeatable runout value for the servo sector comprises:
   determining a first position-error signal (PES) based on the first signal and the second signal;
   determining a second PES based on the third signal and the fourth signal; and determining the repeatable runout value for the servo sector based on the first PES and the second PES.

9. The computer-implemented method of claim 8, wherein the repeatable runout value for the servo sector is based on a difference between the first PES and the second PES.

10. A disk drive, comprising:
a magnetic head;
a disk with a surface on which magnetic servo information can be written; and
a controller configured to perform the steps of:
  writing first servo information and second servo information in a first portion of a servo sector for a track of the disk;
  writing third servo information and fourth servo information in a second portion of the servo sector;
  in a single revolution of the disk, reading a first signal associated with the first servo information, a second signal associated with the second servo information, a third signal associated with the third servo information, and a fourth signal associated with the fourth servo information;
  based on the first signal, the second signal, the third signal, and the fourth signal, determining a repeatable runout value for the servo sector; and
  storing the repeatable runout value for the servo sector in a location that is accessed during operation and used during the operation as a repeatable runout correction factor for the track,
  wherein the first servo information comprises a servo burst with a first duration and the third servo information comprises at least one servo burst with a longer duration than the first duration.

11. The disk drive of claim 10, wherein the second portion of the servo sector corresponds to one or more data sectors of the track.

12. The disk drive of claim 10, wherein the first portion of the servo sector is positioned to be crossed by a read head during the single revolution before the second portion of the servo sector is crossed by the read head during the single revolution.

13. The disk drive of claim 10, wherein the first servo information and the third servo information are written during a first revolution of the disk and the second servo information and the fourth servo information are written during a second revolution of the disk.

14. The disk drive of claim 10, wherein the second servo information comprises a servo burst with a second duration and the fourth servo information comprises at least one servo burst with a longer duration than the second duration.

15. A disk drive, comprising:
a magnetic head;
a disk with a surface on which magnetic servo information can be written; and
a controller configured to perform the steps of:
  writing first servo information and second servo information in a first portion of a servo sector for a track of the disk;
  writing third servo information and fourth servo information in a second portion of the servo sector;
  in a single revolution of the disk, reading a first signal associated with the first servo information, a second signal associated with the second servo information, a third signal associated with the third servo information, and a fourth signal associated with the fourth servo information;
  based on the first signal, the second signal, the third signal, and the fourth signal, determining a repeatable runout value for the servo sector; and
  storing the repeatable runout value for the servo sector in a location that is accessed during operation and used during the operation as a repeatable runout correction factor for the track,
  wherein the first servo information comprises a servo burst with a first duration and the third servo information comprises multiple servo bursts that collectively have a longer duration than the first duration.

16. The disk drive of claim 15, wherein the second servo information comprises a servo burst with a second duration and the fourth servo information comprises multiple servo bursts that collectively have a longer duration than the second duration.

17. The disk drive of claim 10, wherein determining the repeatable runout value for the servo sector comprises:
  determining a first position-error signal (PES) based on the first signal and the second signal;
  determining a second PES based on the third signal and the fourth signal; and
  determining the repeatable runout value for the servo sector based on the first PES and the second PES.

18. The disk drive of claim 17, wherein the repeatable runout value for the servo sector is based on a difference between the first PES and the second PES.

19. The computer-implemented method of claim 6, wherein determining the repeatable runout value for the servo sector comprises:
  determining a first position-error signal (PES) based on the first signal and the second signal;
  determining a second PES based on the third signal and the fourth signal; and
  determining the repeatable runout value for the servo sector based on a difference between the first PES and the second PES.

20. The disk drive of claim 15, wherein determining the repeatable runout value for the servo sector comprises:
  determining a first position-error signal (PES) based on the first signal and the second signal;
  determining a second PES based on the third signal and the fourth signal; and
  determining the repeatable runout value for the servo sector based on a difference between the first PES and the second PES.

* * * * *